UNITED STATES PATENT OFFICE.

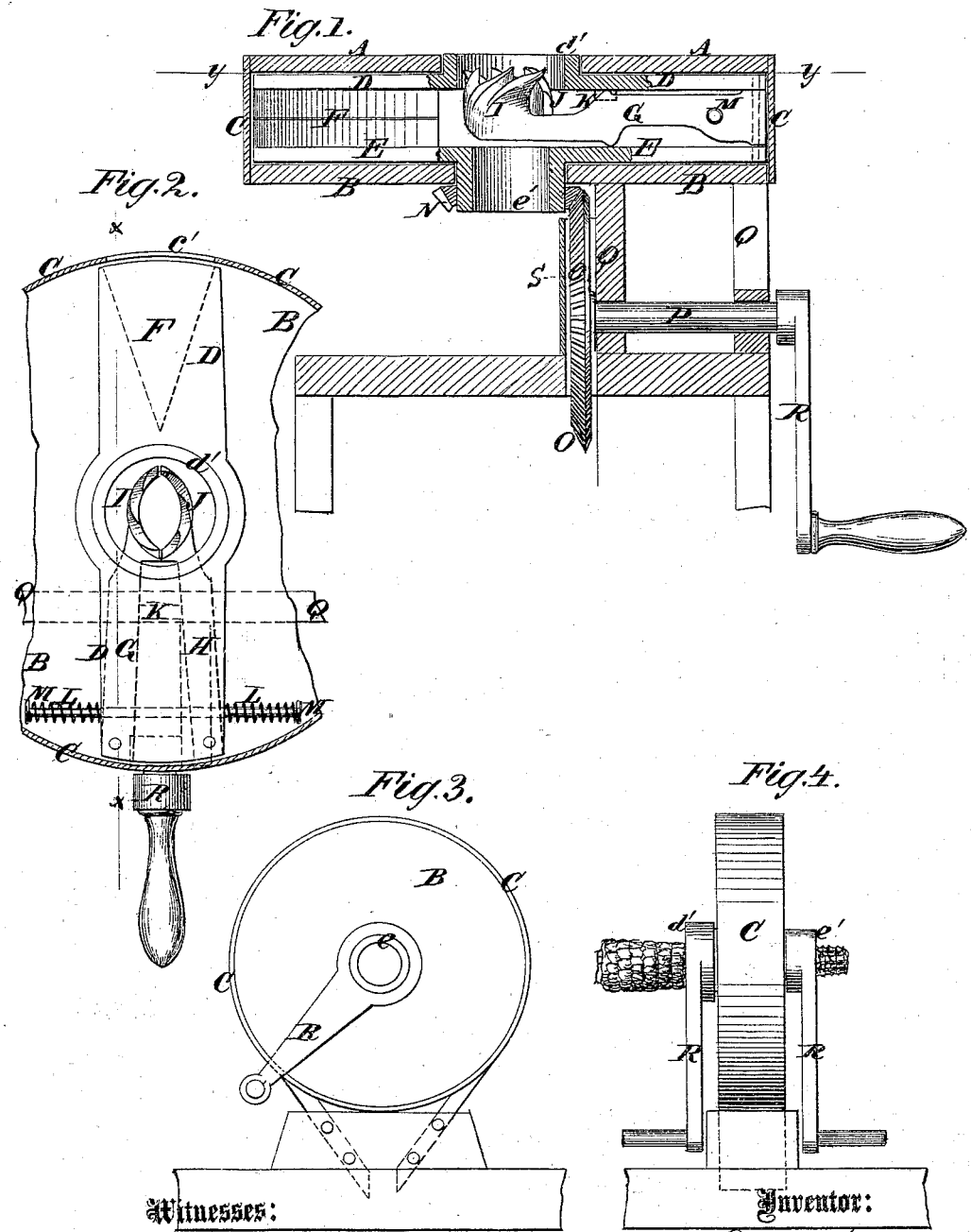

JAMES M. HAWLEY, OF ALMA, ILLINOIS.

IMPROVEMENT IN HAND CORN-SHELLERS.

Specification forming part of Letters Patent No. 135,709, dated February 11, 1873.

*To all whom it may concern:*

Be it known that I, JAMES M. HAWLEY, of Alma, in the county of Marion and State of Illinois, have invented a new and useful Improvement in Hand Corn-Sheller, of which the following is a specification:

Figure 1 is a detail section of my improved corn-sheller taken through the line $x\ x$, Fig. 2. Fig. 2 is a detail section of the same taken through the line $y\ y$, Fig. 1. Fig. 3 is a side view of a modified form of the same. Fig. 4 is an edge view of the modification shown in Fig. 3.

Similar letters of reference indicate corresponding parts.

The invention consists in improving hand corn-shellers, as hereinafter described and claimed.

A and B are two disks, which are connected to each other and held in their proper relative position by a band, C, securely attached to their edges. A part of the band C is cut away to form an opening, $c'$, through which the shelled corn may be allowed to escape. D E are two parallel bars, upon the outer side of each of which is formed a hollow journal, which journals pass through holes in the centers of the disks A B. The bars D E, at one end, are kept at the proper distance apart by a block or blocks, F, to which they are attached. To and between the other ends of the bars D E are pivoted the outer ends of two arms, G H, upon the inner ends of which are formed semicircular jaws I J. The upper edges of the jaws I J project into the hollow journal $d'$ of the bar D. Upon the upper edge of each of the jaws I J are formed three teeth, the two rear ones of which upon each jaw are made smaller than the others, and are arranged upon the arc of a smaller circle so as to operate upon and remove the kernels from the point or small end of the ear. The front tooth upon each jaw is made longer and projects forward in hook form, so as to move along the cob and force the kernels off laterally and toward the shelled end of the cob, so that they may be removed with less force. The upper and lower edges of the arms G H are cut away so as to leave narrow bearings to rest against the inner surfaces of the bars D E. The arms G H are kept from getting out of position, to keep the jaws I J concentric with the hollow journals $d'\ e'$, by a block or stop, K, attached to the inner side of the bar D between the arms G H. The bars D E are held toward each other, pressing the jaws I J against the ear by coiled wire springs L placed upon the outer ends of a rod or bolt, M, that passes through the bars G H, between their pivoting-points and the jaws I J, so that the said springs may press against the outer sides of the said arms G H, as shown in Fig. 2. The hollow journal $d'$ is made of such a size that the unshelled ear may readily pass through it. The hollow journal $e'$ may be made smaller, as only the cob has to pass through that. To the projecting end of the hollow journal $e'$ is attached a bevel-gear wheel, N, the teeth of which mesh into the teeth of the bevel-gear wheel O attached to the end of the shaft P, which revolves in bearings attached to the brackets Q, by which the machine is supported and secured to the bench or table. To the outer end of the shaft P is attached the crank R, by which the sheller is operated. The gear-wheel O is covered by a cap, S, as should also be the gear-wheel N and the end of the hollow journal $d'$, to prevent the moving parts of the machine from coming in contact with the hand of the operator when inserting the ear and withdrawing the cob.

If desired, the machine may be set on edge and secured to the bench by inclined boards inserted in the opening in the band C, and secured to the disks A B and to the bench, as indicated in Figs. 3 and 4. In this case a crank, R, may be attached to each hollow journal, the gear-wheels being omitted, as shown in Fig. 4.

Having thus described my invention, I claim as new and desire to secure by Letters Patent—

The combination of the disks A B, band C, bars and hollow journals D E $d'\ e'$, block or blocks F, pivoted arms G H, jaws I J, stop K, and rod and springs L M, with each other, substantially as herein shown and described, and for the purpose set forth.

JAMES M. HAWLEY.

Witnesses:
GEORGE ROBINSON,
JOSEPHUS FRENCH.